(12) United States Patent
Berkey et al.

(10) Patent No.: US 6,539,154 B1
(45) Date of Patent: Mar. 25, 2003

(54) NON-CONSTANT DISPERSION MANAGED FIBER

(75) Inventors: George E. Berkey, Pine City, NY (US); Dana C. Bookbinder, Corning, NY (US); Alan F. Evans, Beaver Dams, NY (US); Daniel W. Hawtof, Painted Post, NY (US); John M. Lotz, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/691,388

(22) Filed: Oct. 18, 2000

(51) Int. Cl.[7] .................................................. G02B 6/02
(52) U.S. Cl. ........................ 385/123; 385/121; 385/122
(58) Field of Search .................................. 385/123, 121, 385/122

(56) References Cited

U.S. PATENT DOCUMENTS

| | | | |
|---|---|---|---|
| 4,038,062 A | 7/1977 | Presby | 65/2 |
| 4,486,212 A | 12/1984 | Berkey | 65/2 |
| 4,547,650 A | 10/1985 | Arditty et al. | 219/121 LE |
| 5,647,884 A * | 7/1997 | Overton et al. | 65/377 |
| 5,894,537 A | 4/1999 | Berkey et al. | 385/123 |
| 6,044,191 A * | 3/2000 | Berkey et al. | 385/123 |
| 6,298,183 B1 * | 10/2001 | Yamauchi et al. | 385/37 |

FOREIGN PATENT DOCUMENTS

GB 2 213 142 8/1989 .......... C03B/37/07

* cited by examiner

Primary Examiner—Georgia Epps
Assistant Examiner—M. Hasan
(74) Attorney, Agent, or Firm—Robert L. Carlson

(57) ABSTRACT

An improved telecommunications link is provided which includes a dispersion managed fiber with smoothly varying dispersion. The dispersion map may vary sinusoidally or as a sawtooth, for example. The smoothly varying dispersion works well for high data rate transmissions in a return to zero signal format. The dispersion managed fiber with smoothly varying dispersion may be formed by a wide variety of techniques. A method of forming dispersion managed fiber by localized heating or cooling is also provided.

15 Claims, 7 Drawing Sheets

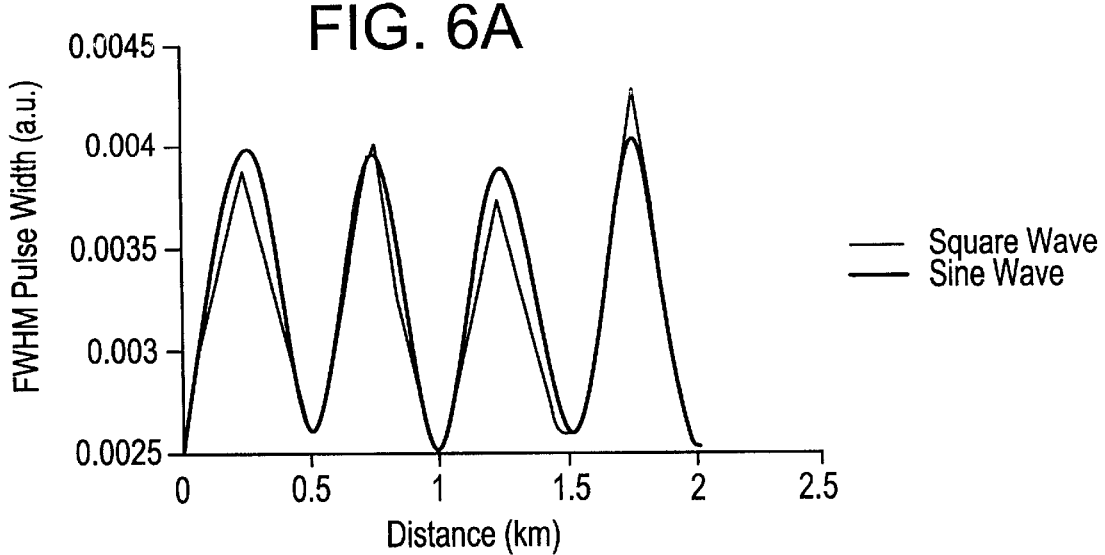
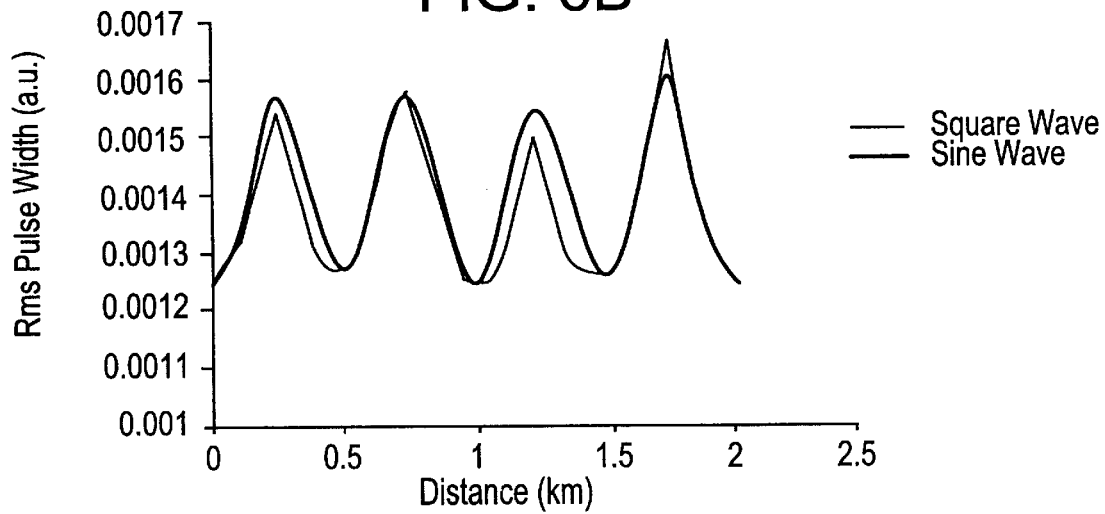
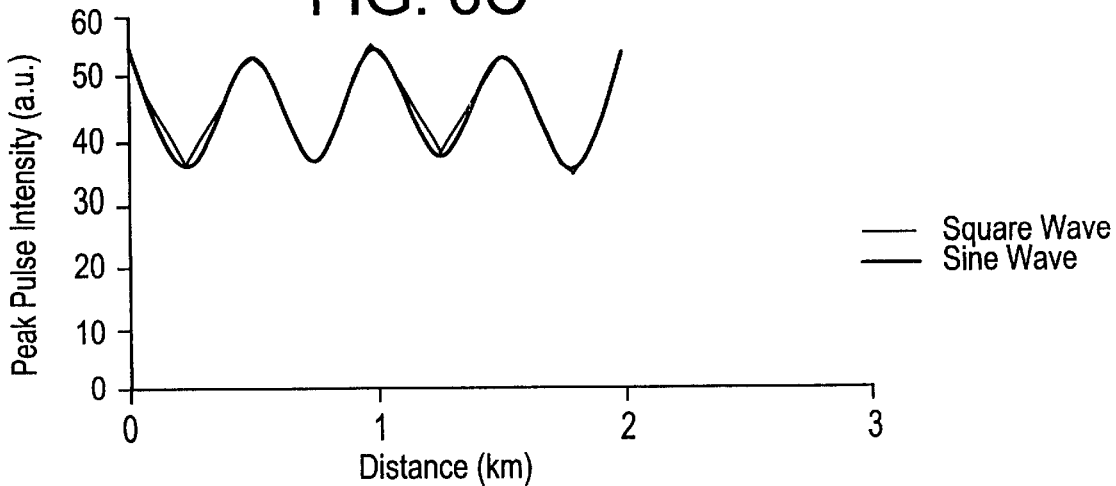

NON-CONSTANT DISPERSION MANAGED FIBER

FIELD OF INVENTION

This invention relates to an improved dispersion managed fiber (DMF), methods of making dispersion managed fiber, and a corresponding apparatus for making such fiber. This invention also relates to a telecommunications link including dispersion managed fiber for transmitting signals in a return-to-zero (RZ) signal format and a corresponding method.

BACKGROUND OF THE INVENTION

Telecommunications networks often include high powered lasers introducing light signals into relatively small effective area optical fibers. The high light power density in these fibers can cause significant nonlinear effects such as four wave mixing (FWM). In order to reduce these signal degrading nonlinear effects, fibers with sufficient dispersion are used in the networks. The dispersion, expressed in picoseconds/nanometer-kilometer (ps/nm-km), tends to broaden a light signal pulse traveling through the fiber thereby decreasing the light power density and reducing nonlinear effects.

While the introduction of dispersion reduces nonlinear effects in the fiber, the accumulation of dispersion over a long length of fiber can cause overbroadening of the signal pulse and may degrade signal transmission. Thus, the accumulated dispersion (or total dispersion product) must remain below an acceptable value which depends upon the transmission parameters, such as modulation format and data bit rate. The dispersion product for a fiber of length L with a dispersion D is the product of L and D, i.e., L·D. Thus, the dispersion product of a length of fiber having individual sections of length $L_i$ and dispersion $D_i$ is the sum of the individual dispersion products $\Sigma L_i \cdot D_i$.

To overcome problems with accumulated dispersion, dispersion is periodically compensated for by introducing dispersion of opposite sign to the accumulated dispersion along the fiber path. In this manner the accumulated dispersion stays below an acceptable value, while on average the dispersion is non-zero, and reduces nonlinear effects.

Dispersion-managed fiber (DMF) is a continuous fiber comprising alternating sections of positive and negative dispersion. These extra design parameters can be used to great advantage to improve the optical data transmission of both non-return-to-zero (NRZ) and return-to-zero (RZ) data modulation formats. For NRZ, high (>5 ps/nm-km) local dispersion reduces FWM while a near zero average dispersion maintains the original shape of the light pulses in the data stream. For nonlinear RZ, the pulses react to high local dispersion by broadening and recompressing. This breathing property reduces or eliminates nearly all degrading effects of distributed fiber loss and discrete, periodic amplification. Although these benefits are known, most attention has been placed on managing dispersion discretely at each amplifier or at the transmitter and receiver in the transmission system.

Dispersion slope is another dispersion parameter which must be taken into consideration for multichannel transmission over a range of light wavelengths. Dispersion slope is the change in the dispersion with change in the transmitting wavelength. If the dispersion slope of the transmitting fiber is not zero, the dispersion will be different for different channels with different wavelengths transmitted. Thus, any dispersion compensation scheme which compensates for the entire wavelength range of a multichannel transmission, must take into account the different dispersion at different wavelengths.

Many prior art dispersion-managed systems consist of discrete sections of constant dispersion fiber fusion spliced together into a long-length fiber link. Examples include standard non-dispersion shifted fiber together with dispersion-compensating modules and dispersion-managed cable with fibers of alternating dispersion sign. Methods of making continuous DMF have also been proposed, such as those disclosed in U.S. Pat. No. 5,849,537 to Berkey et al., which is incorporated by reference. These proposed methods include: 1) longitudinally varying the composition of the soot deposition (or chemical composition in the case of sol gel), 2) reducing the core cane preform diameter by, for example, heating and stretching, grinding and polishing, chemical etching, or laser ablation, 3) decomposing individual cores via dicing and polishing or scribing and breaking and reassembling them into a composite core by insertion into a cladding glass tube, and 4) inducing cladding diameter variation during fiber draw.

Processes 2 and 4 use the same core index profile for both the positive and negative dispersion sections and rely on a diameter stretch factor to achieve the dispersion variation. The index profile is the refractive index as a function of the radial distance from the axis of the fiber. In the profiles disclosed in Berkey et al. a diameter change of 10 to 15% is sufficient to achieve the magnitude of dispersion variation required for many applications where the positive dispersion corresponds to the larger core region. Processes 1 and 3 allow for the individual control of positive and negative dispersion refractive index profiles.

Sharp dispersion transitions have been thought necessary for NRZ systems because more gradual dispersion transitions have been thought to allow for FWM to build up in NRZ systems. Gradual dispersion transitions have also been believed to be detrimental to RZ systems.

Of processing techniques 1–4, only one produces sharp transitions between the dispersion sections, process 3. It is also possible with process 4 but this process could be limited to slow draw speeds. As a result, processes 3 and 4 have been the focus of research.

It is unclear, however, if the methods for producing fibers with sharp transitions are appropriate for high speed DMF manufacturing. Process 3 requires physically disassembling individual canes and reassembling them into a composition cane. The waveguiding region requires an additional surface polishing and a cleaning step to avoid formation of defect seeds. It remains unclear if this can be done repeatably in a manufacturing environment. Method (4) may introduce more gradual transitions either during processing steps, such as cane stretching during redraw, or in later steps, such as with laser ablation, due to diffusion or glass reflow. Even changing the cladding diameter on the draw may not provide sharp enough transitions for the draw speeds desired in production.

BRIEF SUMMARY OF THE INVENTION

An advantage can be achieved if DMF with smoothly varying dispersion maps can be used for nonlinear RZ transmission. The present inventors have discovered, that indeed, for nonlinear RZ transmission, DMF with smoothly varying dispersion maps compare quite favorably with those having sharply varying dispersion maps, such as square wave maps. The present inventors have found that for DMF with smoothly varying dispersion maps, the more gradual dispersion change through the zero dispersion region does not adversely affect transmission. Appropriate smoothly varying dispersion maps include sinusoidal, saw-tooth, trapezoidal, or more arbitrary dispersion maps. An advantage of dispersion maps that do not vary sharply is that the DMF may be processed by a wide variety of techniques, including those that provide a high fiber production rate. Processing techniques not previously thought suitable for producing DMF for NRZ applications have now been found to be acceptable.

According to a second and third embodiment of the present invention, methods of forming DMF by localized heating and cooling, respectively, are provided. The localized heating or cooling methods are suited to forming DMF with either smoothly varying dispersion or sharply varying dispersion. An advantage that can be achieved with the second and third embodiments using localized heating or cooling is that the thermal effect is nearly instantaneous and provides discrete diameter changes without overshoot or ringing. A further advantage that can be achieved with localized heating or cooling is that it is relatively simple to retrofit existing manufacturing draw equipment without affecting other processing or control loops.

BRIEF DESCRIPTION OF THE DRAWINGS

FIGS. 6A–6C illustrate the FWHM pulse width, RMS pulse width, and pulse intensity, respectively, for a square wave and sinusoidal dispersion map.

DETAILED DESCRIPTION OF THE PREFERRED EMBODIMENTS OF THE INVENTION

Figure 1:
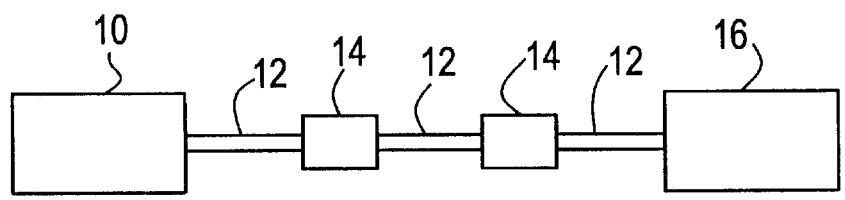
FIG. 1 is a schematic illustrating a telecommunications link incorporating dispersion managed fiber according to a first embodiment of the present invention.

FIG. 1 is a schematic illustrating a telecommunications link incorporating dispersion managed fiber according to a first embodiment of the present invention. The telecommunications link includes a transmitter 10 which transmits light signals to a receiver 16. The transmitter 10 may include, for example, a high powered laser appropriate for telecommunications. The transmitter 10 transmits the light signal into a length of DMF 12 which is one of a plurality of lengths of DMF 12. The light signals are periodically amplified by optical amplifiers 14 which are positioned between the respective lengths of DMF 12 as shown in FIG. 1. The optical amplifiers 14 are optically connected in a series arrangement with the lengths of DMF 12 and act to periodically amplify the optical signal as it passes through the telecommunications link. Finally, the last length of DMF is optically coupled to the receiver 16 which receives the optical signal.

FIG. 1 shows only two optical amplifiers 14 and three lengths of DMF 12 for ease of illustration. In general, the telecommunications link will include many optical amplifiers 14 and lengths of DMF 12.

This exemplary telecommunications link has a transmission rate of not less than 2.5 giga-pulses per second, and the transmission is performed in an RZ format. The power density of the light transmitted in the DMF 12 gives rise to non-linear effects. In general, non-linear effects will depend on several parameters. The degree of non-linearity, $L_{NL}$, in a fiber is given by the equation, $L_{NL}=(\lambda A_{\mathit{eff}})/(2\pi n_2 P_0)$. In this equation $\lambda$, $A_{\mathit{eff}}$, $n_2$, and $P_0$, are the wavelength of the transmitted radiation or light, fiber effective area, non-linear coefficient, and the peak power of the pulse, respectively. To reduce these non-linear effects the dispersion in the DMF 12 acts to broaden the optical pulses transmitted from the transmitter 10 to the receiver 16.

The exemplary telecommunications link may operate at any appropriate radiation transmission wavelength. The transmission wavelength, for example, may be in the range of 1250 to 1700 nm.

While FIG. 1 illustrates only DMF 12 between the transmitter 10 and the receiver 16, the present invention is not so limited. Other types of fiber in addition to the DMF may be provided to optically couple the transmitter to the receiver. For example, single mode fiber (SMF) or large effective area fiber (LEAF) may be in line in addition to the DMF and may be optically coupled to the DMF.

Figure 2:
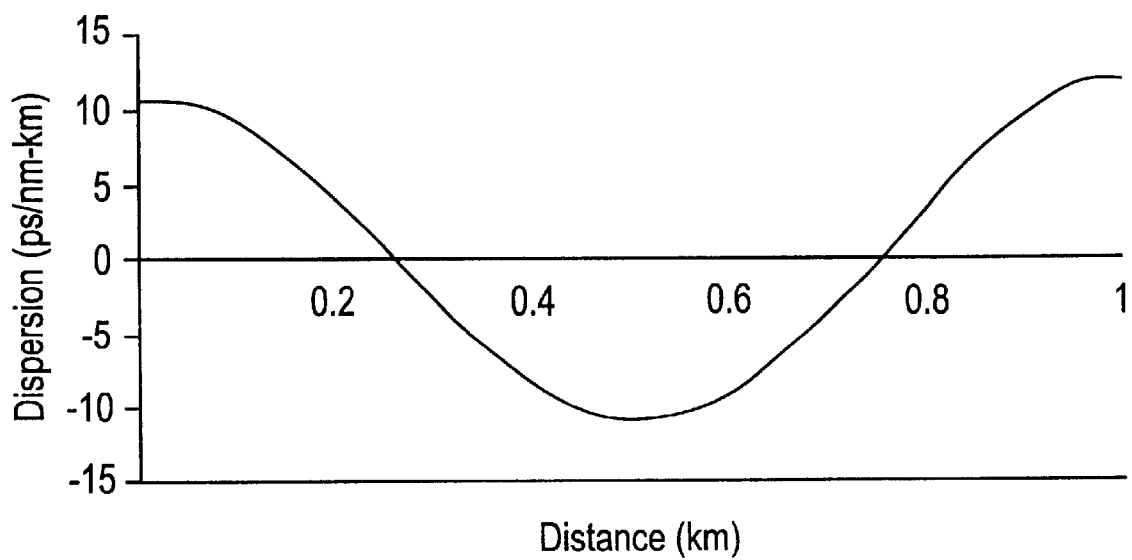
FIG. 2 is a portion of a dispersion map illustrating an example variation in dispersion in a DMF according to the first embodiment of the invention.

FIG. 2 is a portion of a dispersion map illustrating an example variation in dispersion in the DMF 12 of this embodiment of the invention. A dispersion map shows the dispersion as a function of the distance traveled in a fiber system. FIG. 2 shows only a section of the entire dispersion map of the fiber between the transmitter 10 and the receiver 16. In general, the fiber distance between the transmitter 10 and receiver 16 will be hundreds or thousands of kilometers in length. FIG. 2 shows the dispersion map over only one period of variation of the dispersion. The dispersion along the entire fiber distance continues to vary in this periodic fashion.

As can be seen in FIG. 2, the dispersion of the DMF 12 in this embodiment varies smoothly. In this application, smoothly varying means varying without sharp transitions. Thus, a square wave dispersion map, such as that illustrated in FIG. 1 of U.S. Pat. No. 5,849,537, would not be considered to have a smoothly varying dispersion.

Figure 3:
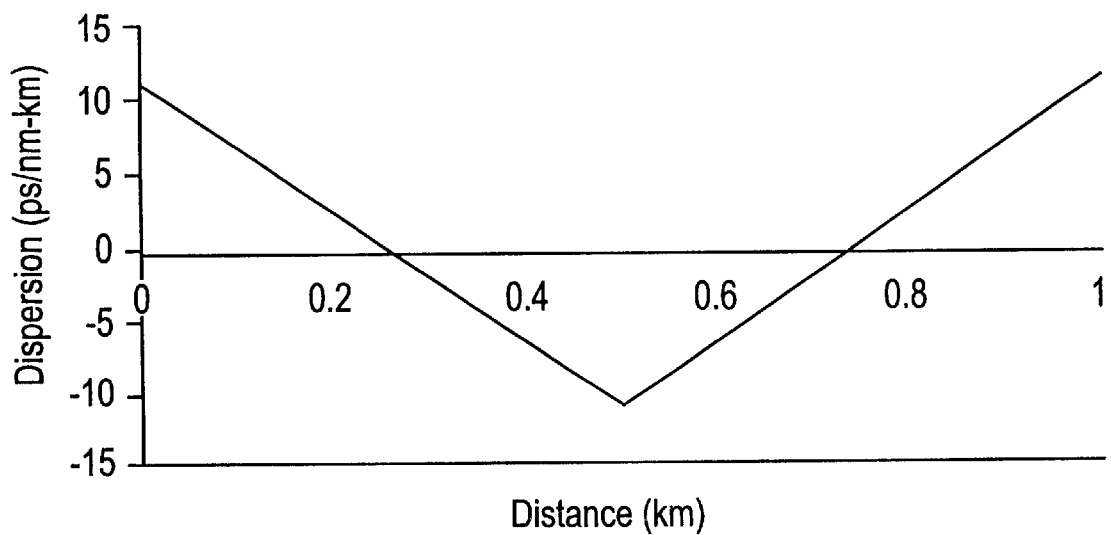
FIG. 3 is a portion of a dispersion map illustrating another example variation in dispersion in a DMF according to the first embodiment of the invention.

In FIG. 2, the dispersion varies in a sinusoidal fashion. However, it is contemplated that the dispersion may have the shape of other waveforms. For example, it is contemplated that the dispersion may have a sawtooth waveform as shown in FIG. 3, or a trapezoidal waveform. In this embodiment it is only important that the dispersion vary in a smooth fashion. The sawtooth waveform is considered to vary smoothly, although the slope of the dispersion line may be discontinuous at the points where the slope changes from positive to negative or from negative to positive.

It is also contemplated that the dispersion map in this embodiment may not have a constant period. In other words, while the dispersion alternates between negative and positive, it is not necessary that the period of this variation be constant.

Figure 4:
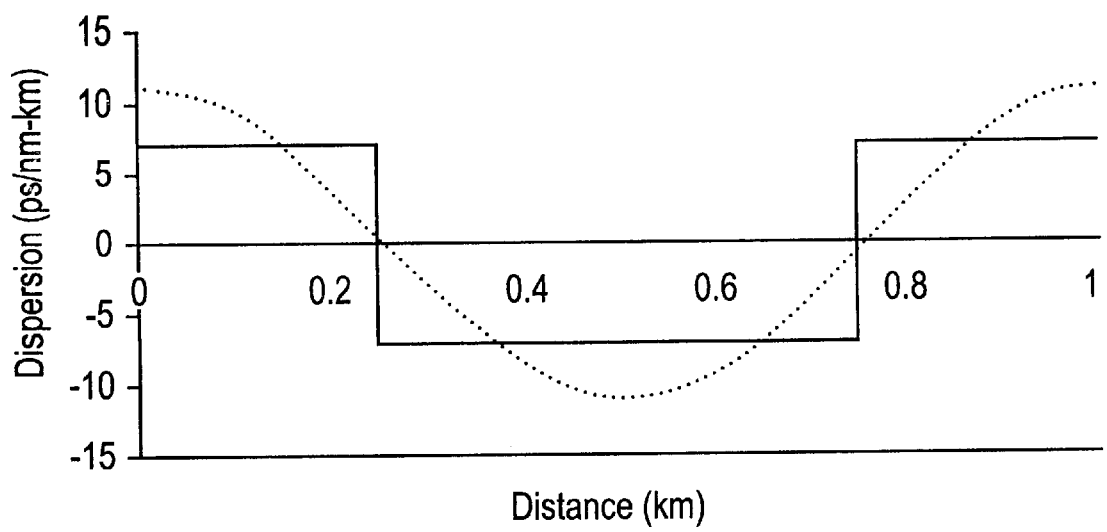
FIG. 4 illustrates a portion of two dispersion maps over one period including a sinusoidally varying dispersion map according to the first embodiment of the invention.

FIG. 4 is a portion of two dispersion maps over one period. The sinusoidally varying dispersion of FIG. 2 is shown as a dashed line. Additionally, for comparison, a square wave dispersion, as is known in the prior art, is shown as a solid line. A simulation was performed to investigate the suitabililiy of the smoothly varying sinusoidal dispersion map for high data rate transmission.

The high data rate transmission system parameters are given as follows for this example. The transmission was for a single wavelength channel at 1550 nm wavelength with a 2.3 ps pulse width. The data rate was 100 Gb/s data rate. The amplifier spacing was 40 km, and the map period was 1 km. The noise level was 5.5 dB, and the loss was set at 0.3 dB/km. The average dispersion was 0.05 ps/nm-km, with a peak-to-peak dispersion amplitude of 14 ps/nm-km.

Figure 5A:
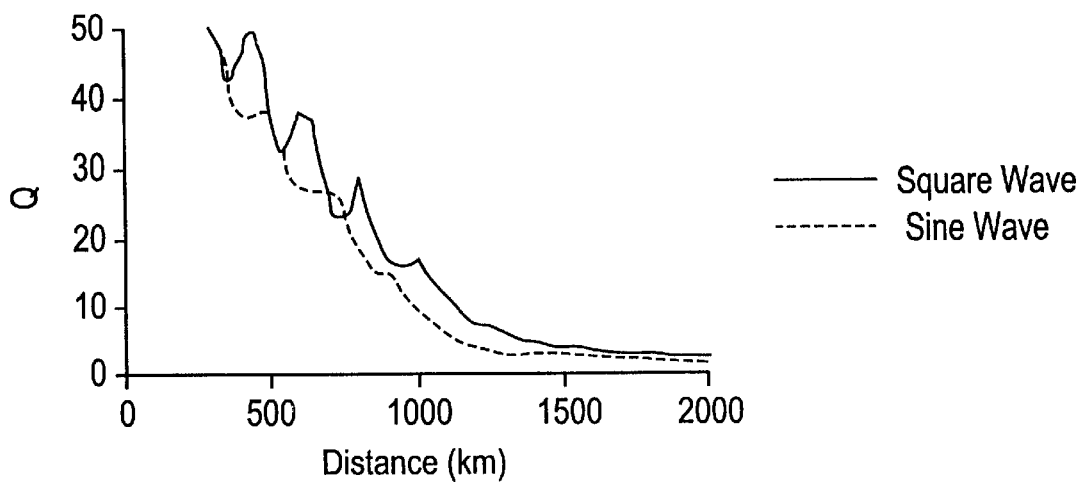
FIGS. 5A and 5B are graphs comparing the transmission Q for the two maps shown in FIG. 4 for different transmission parameters.
Figure 5B:
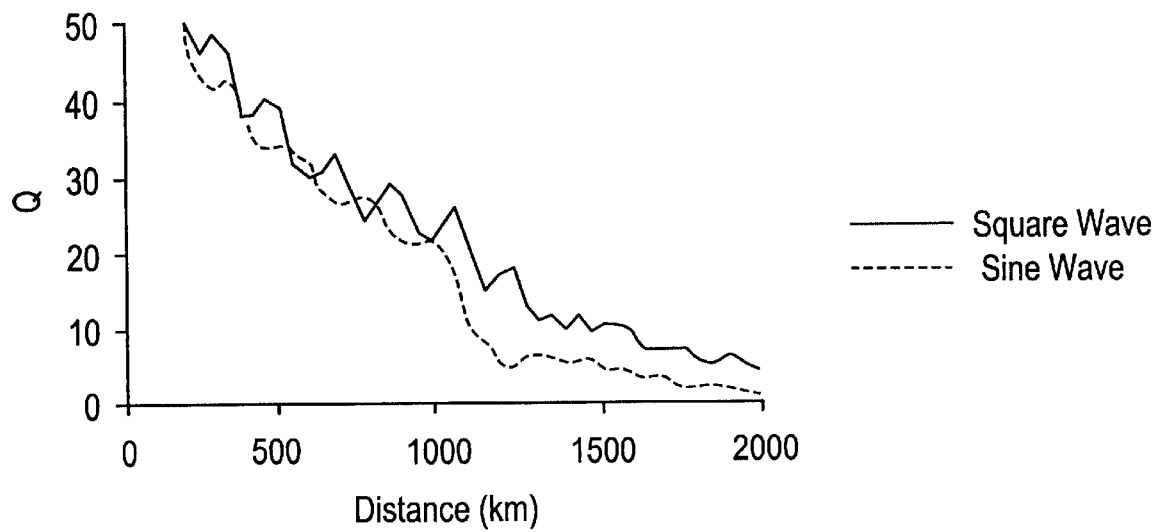

As seen in FIG. 4, the amplitude of the sinusoidal map was set to $\pi/2$ times that of the square wave map such that the accumulated dispersion (dispersion product) over half a dispersion period is equal for the two maps. The transmitted pulse reacts to the accumulation of dispersion along the fiber length, and thus experiences the same dispersion accumulation in both maps. The full system results comparing the transmission Q for the two maps are shown in FIGS. 5A and 5B. The Q value has a one-to-one relationship with the bit error rate (BER). Specifically, the Q value and the BER are related by the equation, BER=($\frac{1}{2}$)(erfc(Q/$\sqrt{2}$)), where erfc is the error function. The results for the square wave dispersion are shown as solid lines, and the results for the sinusoidal dispersion are shown as dotted lines in FIGS. 5A and 5B. FIG. 5A shows the results for a 100 Gb/s transmission rate at the receiver. FIG. 5B shows the results for a 100 Gb/s rate demultiplexed to 25 Gb/s. As can be seen in FIGS. 5A and 5B, the system Q is similar for both maps independent of distance.

Further evidence that the pulses are reacting in a similar fashion to the different dispersion maps is found by probing the pulse width (both full-width-half maximum (FWHM) and root-mean-squared (RMS)) and peak intensity within the first two map periods as shown in FIGS. 6A–6C. For the sake of clarity, the loss is assumed to be equal to zero. Any loss will simply introduce a negative linear slope to the curves, especially for peak intensity. The period of the dispersion maps is 1.0 km as shown in FIGS. 6A–6C. The units of the RMS pulse width, FWHM pulse width, and the pulse intensity are given as arbitrary units in FIGS. 6A–6C, respectively. The values for the sinusoidally varying dispersion are shown by thicker lines than the values for the square wave dispersion.

Because the dispersion amplitudes have been set to give the same dispersion product, the periodic amplitudes of the pulse width and intensity are approximately equal as can be seen in FIGS. 6A–6C. Retaining the same general expansion/recompression pulse characteristics leads to similar system performance. There are small differences, however. The gradual accumulation of dispersion of the sinusoidal map smoothes the width and amplitude of the pulse at the points were dispersion changes sign. A subtle result of this reshaping is that the path-averaged pulse width is about 10% larger for the sinusoidally varying dispersion map as compared to the square wave, without an increase in the minimum or maximum widths. Although a small effect, it is in the right direction to increase the amplifier spacing and tolerance to dispersion fluctuations by the square of the pulse width increase, i.e., by about 20%.

Figure 7:
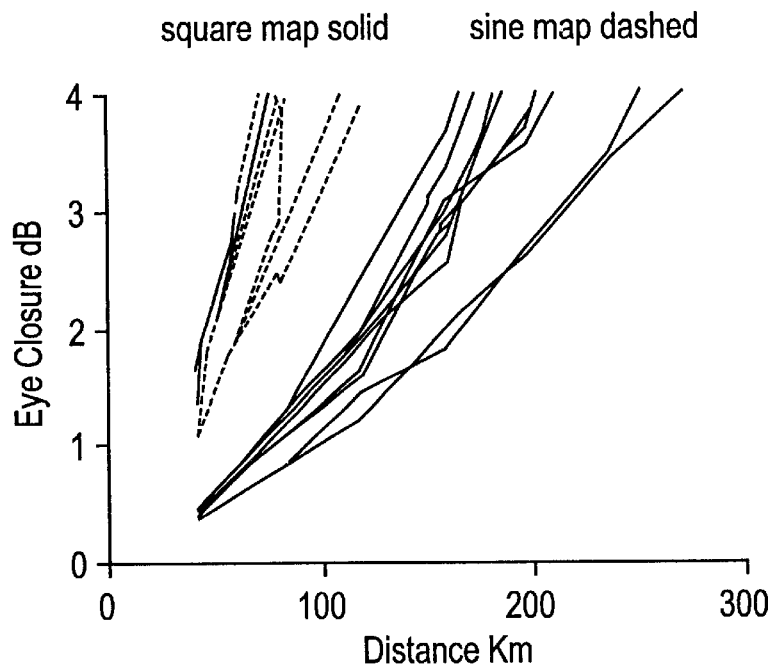
FIG. 7 is a graph comparing the eye opening for a ten channel system for the two maps shown in FIG. 4.

FIG. 7 illustrates eye closure values for the two maps shown in FIG. 4 for a ten channel (wavelength) system. The parameters of the system for FIG. 7 are the same as the system for FIG. 5A except that system of FIG. 7 is a ten channel system with wavelengths from 1532.0 to 1572.5 nm with a 4.5 nm channel spacings. The eye closure provides an indication of the spreading and overlap of pulses. A low eye closure indicates good system performance.

The eye closure is the difference between the eye value at zero kilometers and at the distance of the eye in question, where the eye value in dB is defined as the tallest rectangle with a width of 25% of the bit period that will fit into the eye opening. The eye opening is the region between adjacent pulses on a light intensity plot. As the pulses broaden towards one another, the eye will tend to close.

In FIG. 7, the square wave map is shown as solid lines, while the sine map is show as dashed lines. As can be seen in FIG. 7, the performance of the square wave and the sine wave dispersion are similar.

Thus, system performance is not substantially degraded through the use of dispersion maps with smoothly varying dispersion. Thus, advantageously, high speed manufacturing techniques may be employed in making the DMF used in high data rate transmission systems without degrading the performance. The manufacturing costs are thereby reduced without reducing system performance. Of course, processes that can make both fibers with sharply varying as well as smoothly varying dispersion maps may also be used in this embodiment of the invention.

Manufacturing techniques which may form the DMF with smoothly varying dispersion include: (a) modification of the core refractive index during drawing of the fiber, (b) fabrication of a draw preform having a variable diameter core and a constant diameter cladding or a substantially constant diameter cladding, and (c) fabrication of a draw preform having a constant diameter core and a variable diameter cladding. Such techniques are similar to those disclosed in U.S. Pat. No. 5,894,537, which is incorporated by reference. However, in the method of this embodiment, the fibers are formed to have a smoothly varying dispersion.

Figure 8:
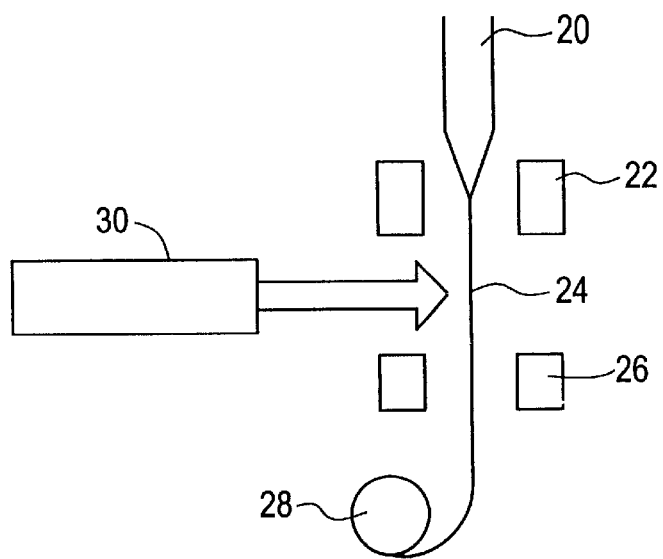
FIG. 8 is a schematic showing an apparatus for making the DMF of the first embodiment of the invention.

FIG. 8 is a schematic showing an apparatus for performing a preferred method of making the DMF according to this embodiment of the invention. A draw blank 20 is heated in a furnace 22, and drawn into a waveguide fiber 24. The waveguide 24 is given a protective coating by coating apparatus 26, and wound onto take up reel 28. This apparatus further includes an ultraviolet (UV) laser 30, directed at the waveguide fiber 24 after drawing but before coating. The UV laser light is known to have the effect of raising the refractive index in a properly doped region of the waveguide. Thus, the UV light will raise the index of refraction of the region of the doped core which is illuminated with the light. In general the increase in the refractive index will depend upon the power density of the UV light illuminating the core, and the length of the UV light exposure. The UV laser, and/or any accompanying optics, are controlled to illuminate the fiber core to produce a sinusoidally varying or other smoothly varying dispersion. An excimer laser operating at 248 nm, for example, may be used to illuminate the fiber core.

In another preferred method of forming the DMF with smoothly varying dispersion, a draw blank with a variable diameter core and constant or nearly constant cladding diameter may be formed. A core preform is a preform that, after being provided with cladding glass, can be drawn into an optical fiber. An economical technique for forming high quality core preforms includes the steps of (a) forming a porous glass preform by a glass particle deposition process, (b) consolidating the porous preform to form a consolidated preform, (c) closing the axial aperture in the consolidated preform if such an aperture exists, and (d) optionally stretching the preform before applying the cladding (the aperture closing step is advantageously performed during this stretching step) as disclosed in U.S. Pat. No. 5,894,537 and U.S. Pat. No. 4,486,212, incorporated herein by reference. As disclosed in U.S. Pat. No. 4,486,212, the core preform may comprise a central region of core glass surrounded by a thin layer of cladding glass. Alternatively, the core preform may consist entirely of core glass. Overclad soot is applied and the preform consolidated into a draw blank.

Figure 9A:
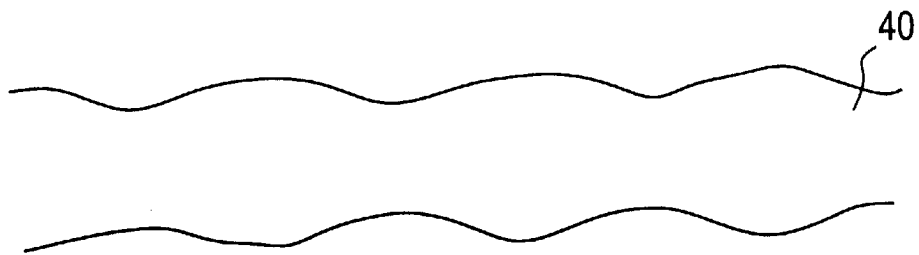
FIGS. 9A and 9B illustrate a glass core preform and draw blank 50 according to a manufacturing method according to the first embodiment of the invention.
Figure 9B:
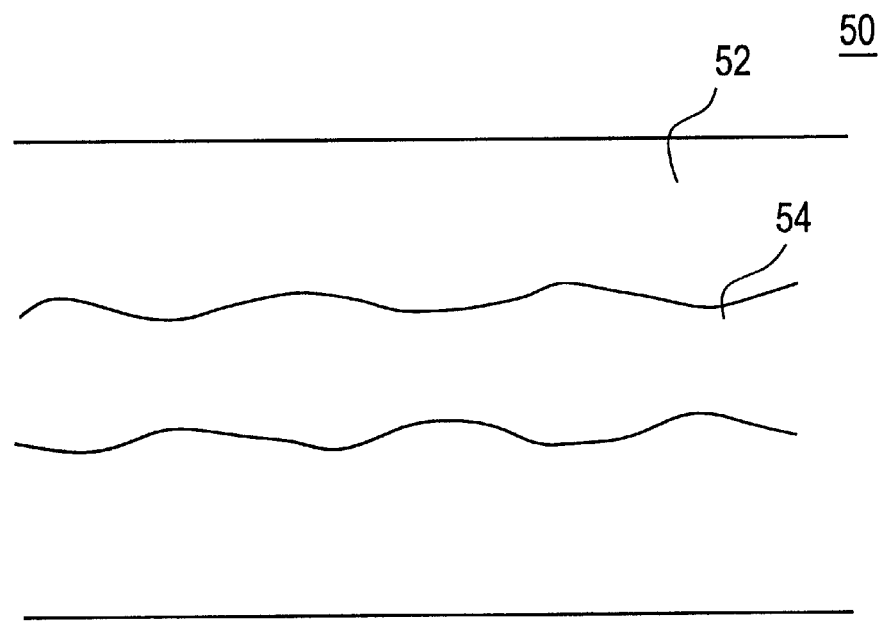

FIGS. 9A and 9B show a glass core preform 40 and draw blank 50 made according to this method of manufacturing a DMF with smoothly varying dispersion. In FIG. 9A the diameter of the preform 40 can be seen to smoothly vary in a sinusoidal fashion. Of course the preform 40 can have a diameter varying in a fashion other than sinusoidal, such as varying trapezoidally or as a sawtooth. The smaller diameter regions of the glass core preform 40 are reduced relative to the larger diameter regions by any of several methods.

One technique for reducing the diameter of regions of the glass preform 40 includes heating and stretching the preform. The diameter of the preform 40 may be varied by locally heating a region of the preform to a sufficient temperature to soften a local region of the preform. For example, the preform may be positioned on a lathe, and a flame directed at a region of the preform. As the glass reaches it softening point the core preform is pulled to reduce the diameter in the heated region. The tension on the preform is controlled such that the preform is pulled only to such an extent to produce a smoothly varying diameter. The shape of the flame is also chosen to produce a smoothly varying diameter. In addition to locally heating the preform, cooling jets may be directed at the regions adjacent the heated regions to control the temperature profile of those regions.

In another heating and stretching method, a laser can be used as an alternative to using a flame for local heating. For example, a $CO_2$ laser would have sufficient power and be suitable for locally heating a preform to locally soften the preform. Furthermore, optics may be employed to shape the laser beam incident on the preform so as to form a smoothly varying diameter. As an alternative to heating, the laser could form a preform with a smoothly varying diameter by ablating regions of the preform instead of simply heating the regions.

Additional techniques for reducing the diameter of regions of the glass core preform 40 include grinding, etching, and laser ablation. A polishing step may be used after grinding and etching to insure a uniform and clean interface between the core and the cladding layer.

Once the preform 40 is formed to have a smoothly varying diameter, cladding soot is formed on the preform 40, as is known in the art. The resultant coated preform is inserted into a consolidation furnace where the soot coating is dried and sintered to form cladding material 52 on the underlying core 54 resulting in a draw blank 50 as shown in FIG. 9B. The layer of cladding will tend to have a substantially constant thickness and the outer surface of the draw blank will therefore be slightly nonuniform (not shown). The draw blank may be smoothed to ensure a uniform outer diameter of the blank. When the draw blank 50 is subsequently drawn to a uniform diameter DMF, the reduced diameter core portions become reduced diameter core portions of the fiber.

Figure 10:
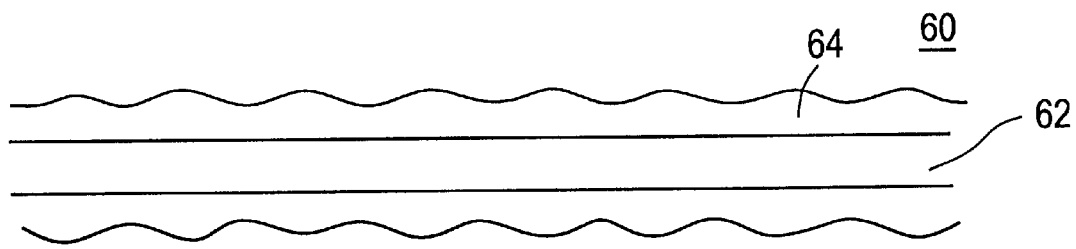
FIG. 10 illustrates a draw blank according to another manufacturing method according to the first embodiment of the invention.

As an alternative to forming a core preform with smoothly varying diameter, the diameter of the core preform may be kept constant, and the diameter of the draw blank may be reduced such that the draw blank diameter is smoothly varying. This may be done in a similar fashion as described above with respect to the core preform. For example, the diameter of the draw blank may be periodically reduced by grinding, polishing, etching, or laser ablation. FIG. 10 shows a draw blank 60 with core region 62 of constant diameter, with a cladding layer 64, where the cladding layer 64 has a smoothly varying diameter. Once the draw blank 60 is formed, the fiber is drawn from the draw blank in, for example, a draw furnace as is well known in the art. The subsequent drawing of the draw blank 60 to a fiber will result in a fiber having a uniform outside diameter, while the variation in the outer diameter of the draw blank will be transferred to the fiber core.

Figure 11:
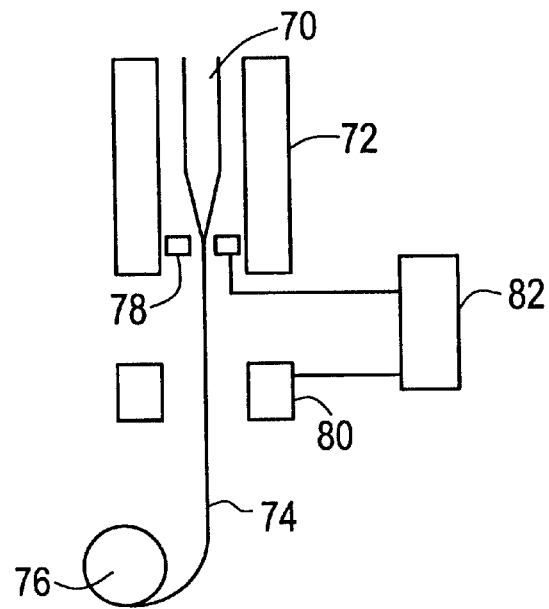
FIG. 11 is a schematic of an apparatus for manufacturing a DMF according to a second embodiment of the invention.

FIG. 11 shows an apparatus for manufacturing a DMF according to a second embodiment of the invention. This apparatus can be used to form a DMF formed having a smoothly varying dispersion. It has also been found, however, that the apparatus may be used to form a DMF having a dispersion that varies as a square wave. In this embodiment, the DMF is formed by periodic localized heating, and/or a change in tension of the fiber during the fiber draw step. This process may be performed in conjunction with a diameter and/or tension monitoring system feedback loop. The periodic localized heating may be focused at the root of a draw blank as the DMF is being drawn.

In FIG. 11, a glass draw blank 70 is positioned within draw furnace 72. The draw furnace 72 provides heat to the draw blank as the DMF fiber 74 is being drawn. The fiber 74 is tensioned as it is being drawn by a tensioner 76. The tensioner 76 may include a spool which winds the fiber 74 as it is drawn.

A localized heater 78 locally heats the fiber 74 as it drawn. The localized heater 78 may periodically provide heat to the fiber 74 so that the diameter of the fiber may accordingly be periodically varied. The localized heater 78 may be positioned to provide localized heat to the fiber 74 at the point where the fiber is drawn from the root of the draw blank as shown in FIG. 11.

The localized heater 78 provides a highly localized region of heated glass, which, if all other draw conditions are maintained, will result in lower viscosity and smaller outer diameter of the fiber 74. Advantageously, for certain properly designed profiles, a change in fiber diameter of −10% changes the fiber dispersion between a high positive dispersion and a high negative dispersion to give complete dispersion compensation.

A fiber diameter measuring unit 80 monitors the diameter of the fiber 74 as it is drawn past the unit 80. The fiber diameter measuring unit 80 sends a signal to a heater controller unit 82 based upon a fiber diameter value measured by the fiber diameter measuring unit 80. Based upon this signal the heater controller unit 82 controls the localized heater 78 to vary the amount of heat to the optical fiber to periodically vary the diameter of the fiber in a controlled fashion.

While the heater controller unit 82 may provide beneficial feedback in controlling the localized heater 78 based upon the measured fiber diameter, the heater controller unit 82 may control the localized heater 78 with no feedback from the fiber diameter measuring unit 80. In other words, the heater controller unit 82 may simply cause the localized heater 78 to periodically provide heat to the fiber 74 with no feedback.

The localized heater 78 may be, for example, a laser which provides a sufficient amount of localized heat to the fiber. A $CO_2$ laser would be appropriate for this purpose. The extra thermal energy of the laser is directed onto the fiber 74 or at the root of the fiber blank. The heat should be delivered to the fiber 74 so that localized, uniform, and symmetrical heating is accomplished. Focusing optics (not shown) may be used to uniformly illuminate the fiber. Heating decreases the fiber viscosity which under constant draw conditions will decrease the fiber diameter.

The laser may be pulsed to provide localized heat according to the desired diameter profile for the fiber. For example, the laser may be modulated on and off at a frequency to create periodic diameter change such that a square wave, periodic dispersion map is created. Alternatively, if a smoothly varying diameter change is desired, the laser power may be modulated such that the laser power continuously varies.

The localized heater 78 may also be a heating ring or microwave/RF system. In any case the heat provided by the localized heater is periodically varied. The localized heater 78 may also provide localized heat by changing the cycling gas composition to increase the thermal conductivity to the region to be heated.

Figure 12:
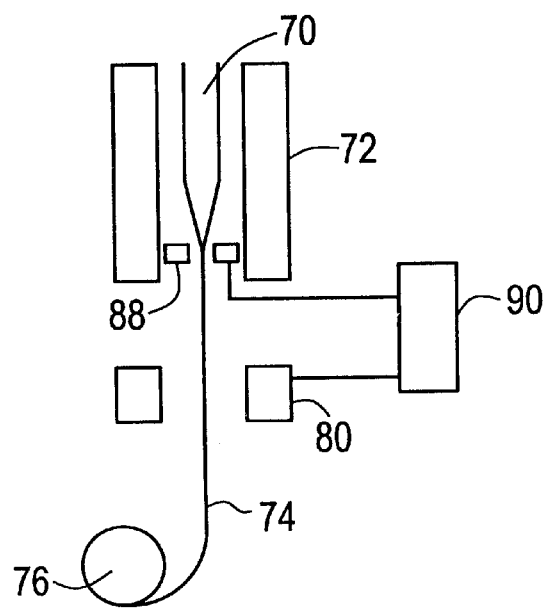
FIG. 12 is a schematic of an apparatus for manufacturing a DMF according to a third embodiment of the invention.

FIG. 12 shows an apparatus for manufacturing a DMF according to a third embodiment of the invention. This third embodiment of the invention is similar to the second embodiment of the invention, but the apparatus of the third embodiment of the invention includes a localized cooler 88 and optionally a cooler controller unit 90 instead of a localized heater and heater controller unit. Thus, the FIG. 12 apparatus includes a draw furnace 72, fiber tensioner 74 and fiber diameter measuring unit 80 in a similar fashion to the FIG. 11 apparatus. Also, like the FIG. 11 apparatus, the FIG. 12 apparatus draws a fiber 74 from a glass draw blank 70 positioned in the draw furnace 72.

The localized cooler 88 provides a highly localized region of cooled glass, which if all other draw conditions are maintained, will result in higher viscosity and larger outer diameter of the fiber 74. The fiber diameter measuring unit 80 sends a signal to a cooler controller unit 90 based upon a fiber diameter value measured by the fiber diameter measuring unit 80. Based upon this signal the cooler controller unit 90 controls the localized cooler 88 to vary the amount of cooling to the optical fiber to periodically vary the diameter of the fiber in a controlled fashion.

While the cooler controller unit 90 may provide beneficial feedback in controlling the localized cooler 88 based upon the measured fiber diameter, the cooler controller unit 90 may control the localized cooler 88 with no feedback from a fiber diameter measuring unit 80. For example, the cooler controller unit 90 may simply cause the localized cooler 88 to periodically provide cooling to the fiber 74 with no feedback.

The localized cooler 88 may be, for example, a cooling gas ring which provides jets of cooling gas to cool the fiber. The cooled gas is directed onto the fiber 74 or at the root of the fiber blank. The cooled gas should be delivered to the fiber 74 so that localized, uniform, and symmetrical cooling is accomplished. Cooling increases the fiber viscosity which under constant draw conditions will increase the fiber diameter.

If desired, the jets of cooling gas may be modulated on and off at a frequency to create periodic diameter change such that a square wave, periodic dispersion map is created. Alternatively, if a smoothly varying diameter change is desired, the cooling gas jets may be modulated such that the cooling gas flow continuously varies.

The localized cooler 88 may also be a thermal blocking tube, which may be periodically inserted to block thermal energy from heating a localized region of the fiber 74. In any case, the cooling provided by the localized cooler is periodically varied. The localized cooler 88 may also provide localized cooling by changing the cycling gas composition to decrease the thermal conductivity to the region to be cooled.

An advantage of the second and third embodiments using localized heating or cooling is that the thermal effect is nearly instantaneous and provides discrete diameter changes without overshoot or ringing. A further advantage of localized heating or cooling is that it is relatively simple to retrofit existing manufacturing draw equipment without affecting other processing or control loops.

In both the second and third embodiments the tensioner 76 may provide periodic tension changes in conjunction with the periodic changes in localized heating or cooling. The change in tension may further enhance the change in the dispersion of the optical fiber.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. A method of making a single optical fiber with a variation of an optical property along the length of the optical fiber, comprising:

tensioning said single mode optical fiber drawn from a glass draw blank; and providing localized heat to the optical fiber as it is drawn past a region, wherein the localized heat is periodically varied to produce the variation of an optical property of the single mode optical fiber along the length of the optical fiber.

2. The method of claim 1, wherein the optical property is fiber dispersion, said dispersion varying periodically along the length of the fiber.

3. The method of claim 2, further comprising:

measuring a diameter value of the optical fiber after the localized heat has been provided to the optical fiber;

providing a signal base on the diameter value to a controller which controls the localized heat provided to the optical fiber; and adjusting the localized heat provided to the optical fiber based on the signal.

4. The method of claim 2, wherein the localized heat is provided to the optical fiber by a laser or a heating ring.

5. The method of claim 4, wherein the localized heat is provided to the optical fiber by a $CO_2$ laser.

6. The method of claim 2, further comprising:

varying the tension applied to the optical fiber as it is drawn past the region simultaneously with varying the localized heat.

7. The method of claim 2, wherein the localized heating is varied to produce a variation in the dispersion which has a sinusoidal, trapezoidal, sawtooth or square wave waveform.

8. The method of claim 2, wherein the optical fiber is selected and the localized heat is varied so as to result in an optical fiber which exhibits a dispersion which varies from positive to negative at a desired operating wavelength.

9. The method of claim 8, wherein the desired operating wavelength is about 1550 nm.

10. A method of making an optical fiber with a variation of an optical property along the length of the optical fiber, comprising:

tensioning an optical fiber drawn from a glass draw blank; and providing localized cooling to the optical fiber as it is drawn past a region, wherein the localized cooling is periodically varied to produce the variation of an optical property of the optical fiber along the length of the optical fiber.

11. The method of claim 10, wherein the optical property is fiber dispersion.

12. The method of claim 11, further comprising:

measuring a diameter value of the optical fiber after the localized cooling has been provided to the optical fiber;

providing a signal base on the diameter value to a controller which controls the localized cooling provided to the optical fiber; and adjusting the localized cooling provided to the optical fiber based on the signal.

13. The method of claim 11, wherein the localized cooling is provided to the optical fiber by a cooling gas ring, thermal blocking tube or cycling gas composition.

14. The method of claim 11, further comprising:

varying the tension applied to the optical fiber as it is drawn past the region simultaneously with providing the localized cooling to the optical fiber.

15. The method of claim 11, wherein the localized cooling is varied to produce a variation in the dispersion which has a sinusoidal, trapezoidal, sawtooth or square wave waveform.

* * * * *